US012618768B2

(12) United States Patent
Law et al.

(10) Patent No.: US 12,618,768 B2
(45) Date of Patent: May 5, 2026

(54) RAIN EROSION TEST DEVICE AND SYSTEM

(71) Applicant: MEGA P&C ADVANCED MATERIALS (SHANGHAI) COMPANY LIMITED, Shanghai (CN)

(72) Inventors: Victor Law, Shanghai (CN); Vida Liu, Shanghai (CN)

(73) Assignee: MEGA P&C ADVANCED MATERIALS (SHANGHAI) COMPANY LIMITED, Shanghai (CN)

( * ) Notice: Subject to any disclaimer, the term of this patent is extended or adjusted under 35 U.S.C. 154(b) by 589 days.

(21) Appl. No.: 18/266,815

(22) PCT Filed: Mar. 22, 2021

(86) PCT No.: PCT/CN2021/082162
§ 371 (c)(1),
(2) Date: Jun. 13, 2023

(87) PCT Pub. No.: WO2022/021904
PCT Pub. Date: Feb. 3, 2022

(65) Prior Publication Data
US 2024/0085308 A1 Mar. 14, 2024

(30) Foreign Application Priority Data
Jul. 26, 2020 (CN) .......................... 202010726988.5

(51) Int. Cl.
*G01N 17/00* (2006.01)
(52) U.S. Cl.
CPC ................................. *G01N 17/002* (2013.01)

(58) Field of Classification Search
CPC ............................ G01N 17/002; G01N 17/00
USPC ..................................... 73/86, 865.6, 170.17
See application file for complete search history.

(56) References Cited

U.S. PATENT DOCUMENTS

2016/0363505 A1* 12/2016 Sterling ............... G01N 17/002

FOREIGN PATENT DOCUMENTS

| CN | 1699962 | A | 11/2005 |
|---|---|---|---|
| CN | 103175773 | A | 6/2013 |
| CN | 103487368 | A * | 1/2014 |
| CN | 207657182 | U | 7/2018 |

(Continued)

*Primary Examiner* — Robert R Raevis
(74) *Attorney, Agent, or Firm* — Bayramoglu Law Offices LLC

(57) ABSTRACT

A rain erosion test device includes an integrated double-wing blade and a drive assembly. The integrated double-wing blade is symmetrical around the center of the integrated double-wing blade, and rotatable around the center in the horizontal plane. A rain erosion sample mold fixing mechanism is provided on a leading edge adjacent to each of two ends of the integrated double-wing blade. The drive assembly is configured to drive the integrated double-wing blade to rotate. The blade of the rain erosion test device has simple machining and a low cost, and can still operate stably when a weight difference between two ends of the blade is up to 1 kg so as to achieve a high error-tolerant rate. The rain erosion test device can realize continuous test on rain erosion resistance of the coating at a speed of 207 m/s or more.

15 Claims, 3 Drawing Sheets

(56)          References Cited

FOREIGN PATENT DOCUMENTS

| CN | 109823567 | A | | 5/2019 | | |
|----|-----------|---|---|--------|---|---|
| CN | 110823742 | A | | 2/2020 | | |
| CN | 111751270 | A | * | 10/2020 | ............ | G01N 17/00 |
| CN | 112407328 | A | * | 2/2021 | | |
| CN | 213022788 | U | | 4/2021 | | |
| WO | 2009074514 | A1 | | 6/2009 | | |

* cited by examiner

RAIN EROSION TEST DEVICE AND SYSTEM

CROSS REFERENCE TO THE RELATED APPLICATIONS

This application is the national phase entry of International Application No. PCT/CN2021/082162, filed on Mar. 22, 2021, which is based upon and claims priority to Chinese Patent Application No. 202010726988.5, filed on Jul. 26, 2020, the entire contents of which are incorporated herein by reference.

TECHNICAL FIELD

The present disclosure relates to the technical field of test on rain erosion resistance of a coating, and in particular to a rain erosion test device and system.

BACKGROUND

For devices working at high speeds in exposed environments, such as high-speed trains and wind turbine blades, erosion to a surface coating is always a matter of great concern. Rain erosion is considered as the leading disruptive factor. In research and development on the coating of the high-speed trains and wind turbine blades, it is important to evaluate rain erosion resistance of the coating in a high-speed state.

There have been mainly two methods to evaluate the rain erosion resistance of the coating. In one method, the coating is applied to a film to form a sample, and the sample is placed statically for direct rain test. With long detection time, this method is only applicable to testing rain erosion resistance of the common coating, rather than the coating in the high-speed state. The other method is to use a three-blade rain erosion tester. The rain erosion tester includes a three-blade structure shown in FIG. 1. In the test, a sample is fixed on the three-blade structure. The three-blade structure is driven by a motor to rotate, thereby simulating a working condition of the coating in the high-speed state. Three coating samples can be tested at once. However, the tester has the following problems in long-term use:

(1) The three-blade structure is complicated. To achieve a desired speed, diameters of the blades are to be increased. In case of meter-level diameters, it is highly difficult to machine the blades, and ensure that the three blades are located on the same circumferential plane and are distributed uniformly. At present, the three-blade structure is dependent on imports and expensive. Thus, a set of tester is sold for RMB 4 million Yuan.

(2) In order to make the three blades located on the same circumferential plane as much as possible, the blades are thickened, and higher requirements are also imposed on a drive mechanism. Consequently, for a fixed driving power, there is a lower rotational speed.

(3) The three-blade rain erosion tester has a low error-tolerant rate. Typically, the tester can only withstand a weight difference of 30 g in the test. Otherwise, the resulting asymmetry may damage the motor, or cause safety accidents. Even falling-off of the coating in the test will make the tester work abnormally. Hence, the tester is stopped basically every 15 min.

(4) Due to limitations in blade machining, error-tolerant rate and other factors, when the blades have a diameter of 1 m, the three-blade rain erosion tester can only test the rain erosion resistance of the coating at a speed of less than 160 m/s. This cannot satisfy test requirements on rain erosion resistance of the coating of the large-diameter wind turbine blades.

SUMMARY

An objective of the present disclosure is to provide a rain erosion test device and system, to overcome defects in the prior art. The blade has simple machining, a low cost and a high error-tolerant rate (stable operation can still be achieved when a weight difference between two ends of the blade is up to 1 kg). The present disclosure can realize continuous test on rain erosion resistance of the coating at a speed of 207 m/s or more, and even can realize continuous test on rain erosion resistance of the coating at a speed of 300 m/s or more through improvement.

The objective of the present disclosure can be achieved by the following technical solutions:

The present disclosure provides a rain erosion test device, including:

an integrated double-wing blade symmetrical around a center of the integrated double-wing blade, and rotatable around the center in a horizontal plane, where a rain erosion sample mold fixing mechanism is provided on a leading edge adjacent to each of two ends of the integrated double-wing blade; and a drive assembly configured to drive the integrated double-wing blade to rotate.

As a preferred technical solution of the present disclosure, the integrated double-wing blade is shaped as a rectangular plate, with the center connected to the drive assembly.

As a preferred technical solution of the present disclosure, arc-shaped extension portions with the center as a circle center are respectively arranged at two sides of the center of the integrated double-wing blade.

As a preferred technical solution of the present disclosure, the rain erosion sample mold fixing mechanism includes a groove formed in the leading edge of the integrated double-wing blade, and at least one row of fixing holes formed in the groove and arranged along a length direction of the blade; and a rain erosion sample mold is fixed on the leading edge of the integrated double-wing blade through bolts in a plurality of fixing holes.

As a preferred technical solution of the present disclosure, the drive assembly is provided below the integrated double-wing blade, and includes a fixed frame, a drive motor fixed on the fixed frame, and a transmission mechanism configured to connect the drive motor and the integrated double-wing blade; the transmission mechanism includes a rotating shaft; and the rotating shaft is rotatably connected to the fixed frame through an enlarged bearing, inserted into the center of the integrated double-wing blade, and configured to drive the integrated double-wing blade to rotate.

As a preferred technical solution of the present disclosure, the rain erosion test device further includes a rain baffle assembly; the rain baffle assembly includes a rain cover surrounding the fixed frame, a first rain baffle disc provided on a top of the fixed frame, and a second rain baffle disc fixed below the integrated double-wing blade; the first rain baffle disc and the second rain baffle disc are concentric with the center of the integrated double-wing blade, respectively; and the enlarged bearing is provided between the first rain baffle disc and the second rain baffle disc.

As a preferred technical solution of the present disclosure, an upper surface of the first rain baffle disc inclines gradually downward from a center to an edge.

As a preferred technical solution of the present disclosure, the rain erosion test device further includes a cable protection pipeline; and one end of the cable protection pipeline is connected to the rain cover, and the other end of the cable protection pipeline is connected to a power supply.

A second aspect of the present disclosure provides a rain erosion test system, including a rain spray frame, a rain gauge, a drainage groove, and the rain erosion test device according to any one of Implementations 1 to 8, where the rain erosion test device is provided in the rain spray frame; a plurality of rain spray nozzles located above the rain erosion test device and surrounding the rain erosion test device are arranged on the rain spray frame; the rain gauge is configured to obtain a rain spraying amount; and the drainage groove is arranged around an outer periphery of the rain spray frame.

As a preferred technical solution of the present disclosure, the rain erosion test system is provided in an enclosable space with an enclosing wall at a periphery; and the drainage groove is arranged along an inner side of the enclosing wall.

As a preferred technical solution of the present disclosure, the rain spray nozzles are arranged at 0.5-10 m above the rain erosion test device.

When the rain erosion test system works, a rain erosion sample mold is fixed on a rain erosion sample mold fixing mechanism at each of two ends of a leading edge of the blade. The drive assembly is started to drive the integrated double-wing blade to rotate at a high speed. The rain spray nozzles spray rain to the high-speed rotating blade, thereby simulating rain erosion of a coating in a high-speed condition, and testing rain erosion resistance of the coating.

Compared with the prior art, the present disclosure has the following beneficial effects:

(1) The integrated double-wing blade shaped as the rectangular plate is machined simply. The symmetrical blade can be made simply and easily, which prevents the problems of hard machining and high cost of the three-blade structure. Moreover, the blade is machined to a larger diameter more easily, and has a lighter weight than the three-blade structure, which is more useful to improve a rotational speed and simulate a high-speed condition.

(2) The blade in the present disclosure is stressed more uniformly in operation, and can withstand a greater imbalance. Through test, when a weight difference between two ends of the blade is up to 1 kg, stable operation can still be achieved. The present disclosure can carry out the test at a time without a stop. Compared with the three-blade structure which is stopped every 15 min, the present disclosure tests less samples at a time, but has a higher test efficiency than the three-blade structure.

(3) Typically, the present disclosure can realize test on rain erosion resistance of the coating at a speed of 207 m/s or more, and even can realize test on rain erosion resistance of the coating at a speed of 300 m/s or more in cooperation with the enlarged bearing. The present disclosure has a greater limiting speed than the three-blade structure.

In the figures: 1: integrated double-wing blade, 11: rain erosion sample mold fixing mechanism, 111: groove, 112: fixing hole, 12: arc-shaped extension portion, 21: fixed frame, 22: drive motor, 23: rotating shaft, 24: enlarged bearing, 31: rain cover, 32: first rain baffle disc, 33: second rain baffle disc, 4: rain erosion sample mold, 5: cable protection pipeline, 6: rain spray frame, 61: rain spray nozzle, 7: rain gauge, 8: drainage groove, and 9: enclosing wall.

DETAILED DESCRIPTION OF THE EMBODIMENTS

The present disclosure will be described in detail below with reference to the drawings and specific examples.

Embodiment 1

Figure 2:
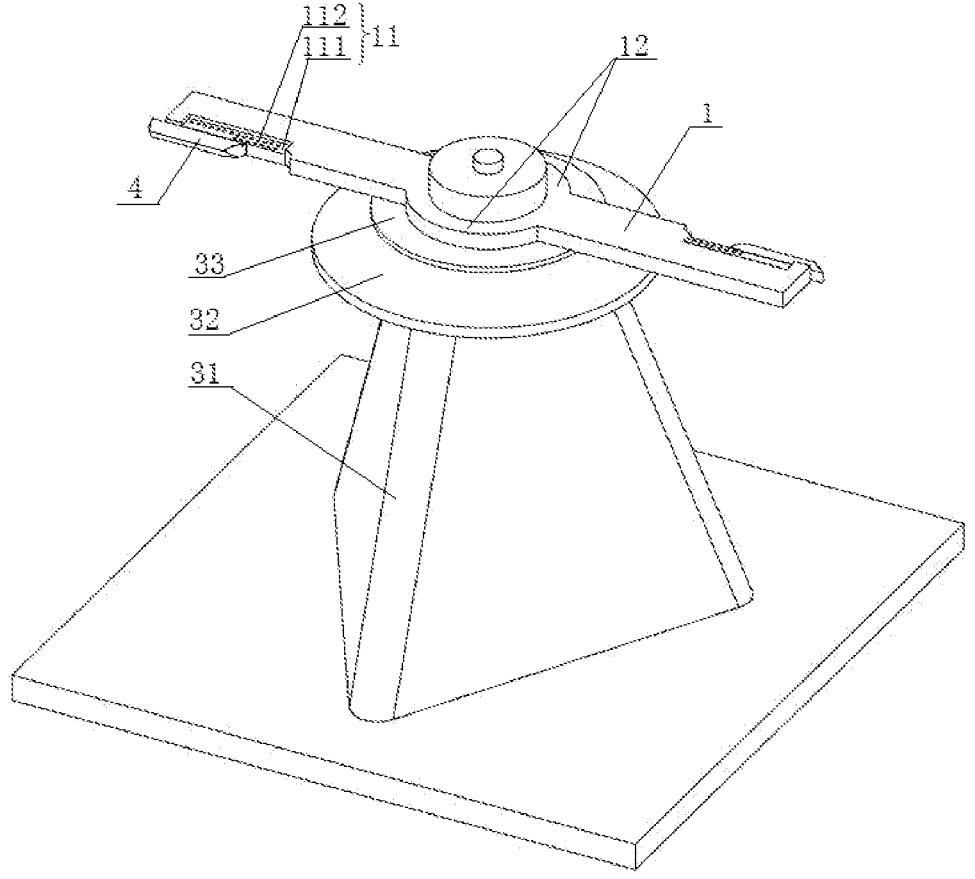
FIG. 2 is a schematic structural view of a rain erosion test device according to Embodiment 1 of the present disclosure.
Figure 3:
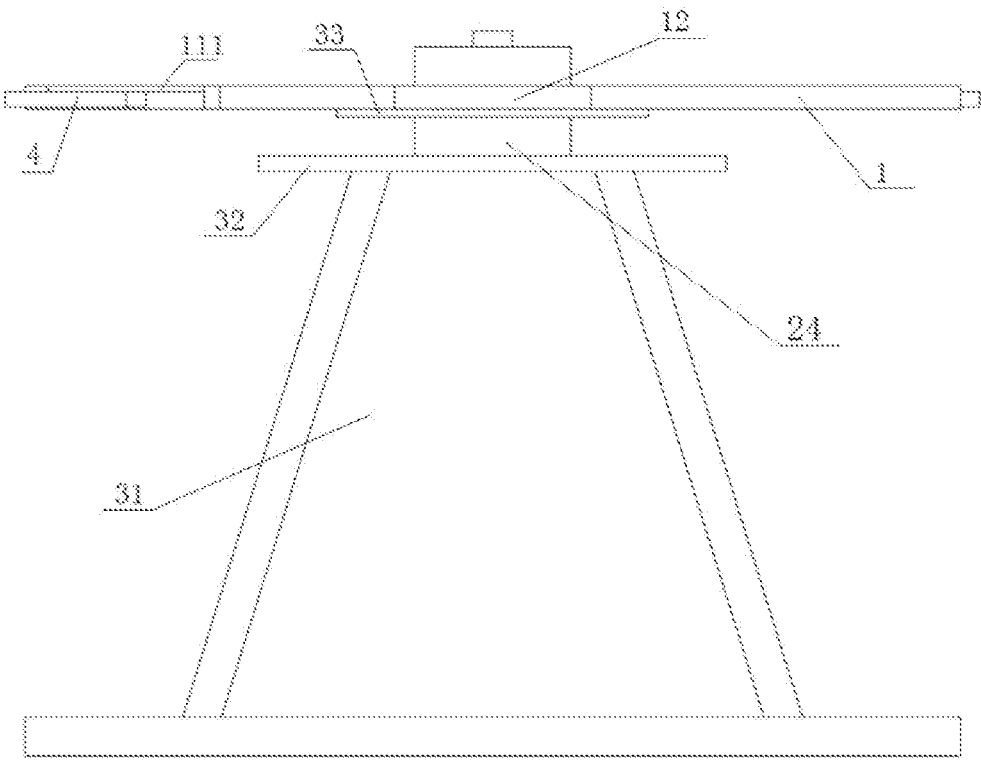
FIG. 3 is a schematic structural front view of a rain erosion test device according to Embodiment 1 of the present disclosure.

As shown in FIGS. 2-3, a rain erosion test device includes integrated double-wing blade 1 and a drive assembly. The integrated double-wing blade 1 is symmetrical around a center of the integrated double-wing blade, and rotatable around the center in a horizontal plane. Rain erosion sample mold fixing mechanism 11 is provided on a leading edge adjacent to each of two ends of the integrated double-wing blade 1. The drive assembly is configured to drive the integrated double-wing blade 1 to rotate.

In the embodiment, preferably, the integrated double-wing blade 1 is shaped as a rectangular plate, with the center connected to the drive assembly. The integrated double-wing blade 1 shaped as the rectangular plate is machined simply. The symmetrical blade can be made simply and easily, which prevents the problems of hard machining and high cost of the three-blade structure. Moreover, the blade is machined to a larger diameter (the diameter can be up to 2 m or more) more easily, and has a lighter weight than the three-blade structure, which is more useful to improve a rotational speed and simulate a high-speed condition. Further preferably, arc-shaped extension portions 12 with the center as a circle center are respectively arranged at two sides of the center of the integrated double-wing blade 1. The arc-shaped extension portions 12 at the two sides of the blade form a circular structure with the center of the blade as a circle center. This makes the blade mounted better without excessively increasing a weight of the blade, and ensures the stable connection between the drive assembly and the blade.

In the embodiment, preferably, the rain erosion sample mold fixing mechanism 11 includes groove 111 formed in the leading edge of the integrated double-wing blade 1, and at least one row of fixing holes 112 formed in the groove 111 and arranged along a length direction of the blade. Rain erosion sample mold 4 is fixed on the leading edge of the integrated double-wing blade 1 through bolts in a plurality of fixing holes 112. With the groove 111, the bolts for fixing the rain erosion sample mold 4 do not protrude from a surface of the blade. This prevents protruded bolt heads from disturbing an airflow in a high-speed movement to cause unstable operation. Typically, the groove is longer than the rain erosion sample mold 4. This facilitates selection of a mounting position of the rain erosion sample mold 4 according to conditions, thereby simulating working conditions in different speeds in cooperation with the rotational speed of the motor. On the other hand, this can also be adapted for mounting the rain erosion sample molds 4 of different lengths. In the embodiment, the rain erosion sample mold 4 can be made with a device for manufacturing a rain erosion sample mold in Chinese Patent Application No. CN 207657182 U.

Figure 4:
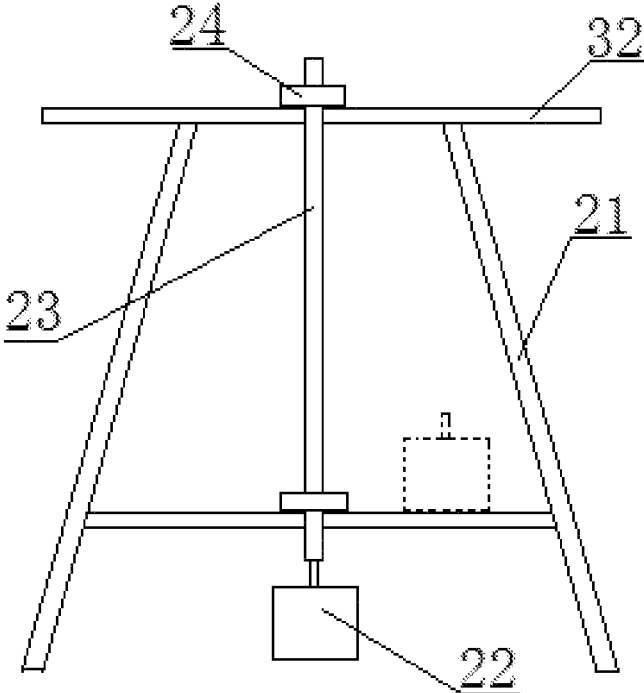
FIG. 4 is a schematic structural view of a drive assembly of a rain erosion test device according to Embodiment 1 of the present disclosure.

In the present disclosure, as shown in FIG. 4, the drive assembly is provided below the integrated double-wing blade 1, and includes fixed frame 21, drive motor 22 fixed on the fixed frame 21, and a transmission mechanism configured to connect the drive motor 22 and the integrated double-wing blade 1. The transmission mechanism includes rotating shaft 23. The rotating shaft 23 is rotatably connected to the fixed frame 21 through enlarged bearing 24 (namely a larger bearing), inserted into the center of the integrated double-wing blade 1, and configured to drive the integrated double-wing blade 1 to rotate. The drive motor 22 may be coaxial with the rotating shaft 23. It directly drives the rotating shaft 23, and may also drive the rotating shaft 23 through a reducer, a gear or a belt to rotate.

In the embodiment, as shown in FIGS. 2-3, the rain erosion test device further includes a rain baffle assembly. The rain baffle assembly includes rain cover 31 surrounding the fixed frame 21, first rain baffle disc 32 provided on a top of the fixed frame 21, and second rain baffle disc 33 fixed below the integrated double-wing blade 1. The first rain baffle disc 32 and the second rain baffle disc 33 are concentric with the center of the integrated double-wing blade 1, respectively. The enlarged bearing 24 is provided between the first rain baffle disc 32 and the second rain baffle disc 33. The second rain baffle disc 33 rotates with the blade. It makes a centrifugal movement to throw away water, thereby preventing the water from falling onto the bearing. The first rain baffle disc 32 further protects devices such as the drive motor 22 in the fixed frame. Further preferably, an upper surface of the first rain baffle disc 32 inclines gradually downward from a center to an edge. Water falling onto the first rain baffle disc 32 flows down along the edge of the first rain baffle disc. Further preferably, the rain cover 31 and the fixed frame 21 gradually increase from top to bottom. The first rain baffle disc 32 has a larger size than a top of the rain cover 31. The rain erosion test device further includes cable protection pipeline 5. One end of the cable protection pipeline 5 is connected to the rain cover 31, and the other end of the cable protection pipeline 5 is connected to a power supply, thereby protecting a cable.

Figure 5:
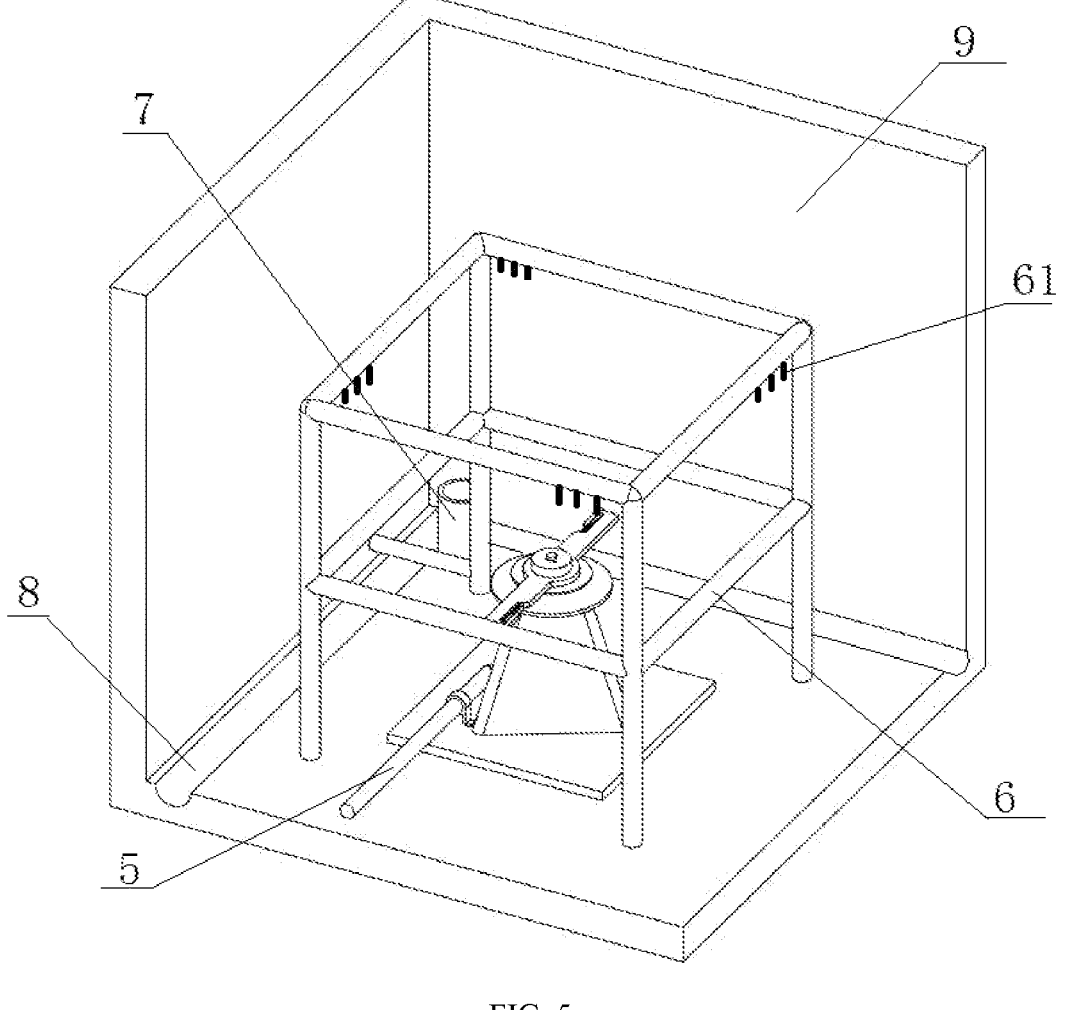
FIG. 5 is a schematic structural view of a rain erosion test system according to Embodiment 1 of the present disclosure.

An embodiment further provides a rain erosion test system. As shown in FIG. 5, the rain erosion test system includes rain spray frame 6, rain gauge 7, drainage groove 8, and the rain erosion test device. The rain erosion test device is provided in the rain spray frame 6. A plurality of rain spray nozzles 61 located above the rain erosion test device and surrounding the rain erosion test device are arranged on the rain spray frame 6. The rain gauge 7 is configured to obtain a rain spraying amount. The drainage groove 8 is arranged around an outer periphery of the rain spray frame 6. Preferably, the rain erosion test system is provided in an enclosable space with enclosing wall 9 at a periphery. The drainage groove 8 is arranged along an inner side of the enclosing wall 9. The rain erosion test device is placed at a center within the enclosing wall. Further preferably, the ground is gradually lower from the center to the inner side of the enclosing wall, such that sprayed water flows to the drainage groove conveniently. The rain spray nozzles 61 may be arranged at 0.5-10 m above the rain erosion test device. Preferably, the value is 4 m, which facilitates secondary distribution of rainwater and makes the rainwater more uniform.

Figure 1:
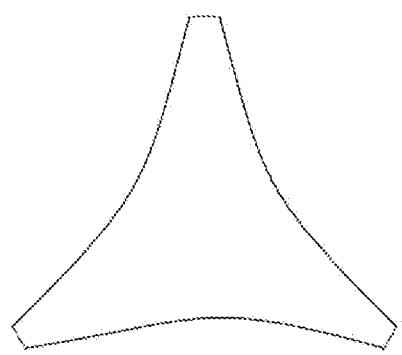
FIG. 1 is a schematic view of a three-blade structure in the prior art.

Compared with the three-blade structure (as shown in FIG. 1) in the prior art, the blade of the present disclosure has simple machining, a low cost and a high error-tolerant rate (stable operation can still be achieved when a weight difference between two ends of the blade is up to 1 kg). The present disclosure can realize continuous test on rain erosion resistance of the coating at a speed of 207 m/s or more, and even can realize continuous test on rain erosion resistance of the coating at a speed of 300 m/s or more through the enlarged bearing and the like.

The above description of the examples is intended to facilitate a person of ordinary skill in the art to understand and use the present disclosure. Obviously, those skilled in the art can easily make various modifications to these examples, and apply a general principle described herein to other examples without creative efforts. Therefore, the present disclosure is not limited to the above examples. All improvements and modifications made by a person skilled in the art according to the disclosure of the present disclosure should fall within the protection scope of the present disclosure.

What is claimed is:

1. A rain erosion test device, comprising:
   an integrated double-wing blade symmetrical around a center of the integrated double-wing blade, and rotatable around the center in a horizontal plane, wherein a rain erosion sample element fixing component is provided on a leading edge adjacent to each of two ends of the integrated double-wing blade; and
   a drive assembly configured to drive the integrated double-wing blade to rotate,
   wherein the integrated double-wing blade is shaped as plate, with the center connected to the drive assembly.

2. The rain erosion test device according to claim 1, wherein the plate is a rectangular plate.

3. The rain erosion test device according to claim 2, wherein arc-shaped extension portions with the center of the integrated double-wing blade as a circle center are respectively arranged at two sides of the center of the integrated double-wing blade.

4. The rain erosion test device according to claim 1, wherein the rain erosion sample element fixing component on the leading edge adjacent to each of two ends of the integrated double-wing blade comprises a groove formed in the leading edge of the integrated double-wing blade, and at least one row of fixing holes formed in the groove and arranged along a length direction of the integrated double-wing blade; and a rain erosion sample element is fixed on the leading edge of the integrated double-wing blade through bolts in a plurality of fixing holes of the at least one row of fixing holes.

5. The rain erosion test device according to claim 1, wherein the drive assembly is provided below the integrated double-wing blade, and the drive assembly comprises a fixed frame, a drive motor fixed on the fixed frame, and a transmission mechanism configured to connect the drive motor and the integrated double-wing blade; the transmission mechanism comprises a rotating shaft; and the rotating shaft is rotatably connected to the fixed frame through a bearing, inserted into the center of the integrated double-wing blade, and configured to drive the integrated double-wing blade to rotate.

6. The rain erosion test device according to claim 5, further comprising a rain baffle assembly, wherein the rain baffle assembly comprises a rain cover surrounding the fixed frame, a first rain baffle disc provided on a top of the fixed frame, and a second rain baffle disc fixed below the integrated double-wing blade; the first rain baffle disc and the second rain baffle disc are concentric with the center of the integrated double-wing blade, respectively; and the bearing is provided between the first rain baffle disc and the second rain baffle disc.

7. The rain erosion test device according to claim 6, further comprising a cable protection pipeline, wherein a first end of the cable protection pipeline is connected to the rain cover, and a second end of the cable protection pipeline is connected to a power supply.

8. A rain erosion test system, comprising a rain spray frame, a rain gauge, a base portion including a drainage groove, and the rain erosion test device according to claim 1, wherein the rain erosion test device is provided in the rain spray frame; a plurality of rain spray nozzles located above the rain erosion test device and surrounding the rain erosion test device are arranged on the rain spray frame; the rain gauge is configured to obtain a rain spraying amount; and the drainage groove is arranged around an outer periphery of the rain spray frame.

9. The rain erosion test system according to claim 8, wherein the rain erosion test system is provided in an enclosable space with an enclosing wall at a periphery; and the drainage groove is arranged along an inner side of the enclosing wall; and the plurality of rain spray nozzles are arranged at 0.5 m-10 m above the rain erosion test device.

10. The rain erosion test system according to claim 8, wherein in the rain erosion test device, the integrated double-wing blade is shaped as a rectangular plate, with the center connected to the drive assembly.

11. The rain erosion test system according to claim 10, wherein in the rain erosion test device, arc-shaped extension portions with the center of the integrated double-wing blade as a circle center are respectively arranged at two sides of the center of the integrated double-wing blade.

12. The rain erosion test system according to claim 8, wherein in the rain erosion test device, the rain erosion sample element fixing component comprises a groove formed in the leading edge of the integrated double-wing blade, and at least one row of fixing holes formed in the groove and arranged along a length direction of the integrated double-wing blade; and a rain erosion sample element is fixed on the leading edge of the integrated double-wing blade through bolts in a plurality of fixing holes of the at least one row of fixing holes.

13. The rain erosion test system according to claim 8, wherein in the rain erosion test device, the drive assembly is provided below the integrated double-wing blade, and the drive assembly comprises a fixed frame, a drive motor fixed on the fixed frame, and a transmission mechanism configured to connect the drive motor and the integrated double-wing blade; the transmission mechanism comprises a rotating shaft; and the rotating shaft is rotatably connected to the fixed frame through a bearing, inserted into the center of the integrated double-wing blade, and configured to drive the integrated double-wing blade to rotate.

14. The rain erosion test system according to claim 13, wherein the rain erosion test device further comprises a rain baffle assembly, wherein the rain baffle assembly comprises a rain cover surrounding the fixed frame, a first rain baffle disc provided on a top of the fixed frame, and a second rain baffle disc fixed below the integrated double-wing blade; the first rain baffle disc and the second rain baffle disc are concentric with the center of the integrated double-wing blade, respectively; and the bearing is provided between the first rain baffle disc and the second rain baffle disc.

15. The rain erosion test system according to claim 14, wherein the rain erosion test device further comprises a cable protection pipeline, wherein a first end of the cable protection pipeline is connected to the rain cover, and a second end of the cable protection pipeline is connected to a power supply.

\* \* \* \* \*